United States Patent
Ormson

(10) Patent No.: US 7,047,037 B2
(45) Date of Patent: May 16, 2006

(54) DUAL MODE MOBILE COMMUNICATION DEVICES AND METHOD FOR SELECTING A NETWORK

(75) Inventor: Richard Ormson, Berkshire (GB)

(73) Assignee: NEC Corporation, Tokyo (JP)

( * ) Notice: Subject to any disclaimer, the term of this patent is extended or adjusted under 35 U.S.C. 154(b) by 232 days.

(21) Appl. No.: 10/716,498

(22) Filed: Nov. 20, 2003

(65) Prior Publication Data

US 2004/0106401 A1   Jun. 3, 2004

(30) Foreign Application Priority Data

Nov. 26, 2002   (GB) ................................. 0227524.6

(51) Int. Cl.
  *H04M 1/00*   (2006.01)
(52) U.S. Cl. .................. 455/552.1; 455/434; 455/436; 370/331; 370/351
(58) Field of Classification Search ............. 455/552.1, 455/434, 436; 370/331, 351
  See application file for complete search history.

(56) References Cited

U.S. PATENT DOCUMENTS

| | | | |
|---|---|---|---|
| 5,574,973 A * | 11/1996 | Borth et al. ............. | 455/435.2 |
| 6,477,162 B1 | 11/2002 | Bayley et al. | |
| 2002/0137513 A1 | 9/2002 | Aihara et al. | |
| 2002/0160785 A1 * | 10/2002 | Ovesjo et al. ............. | 455/453 |
| 2003/0031143 A1 | 2/2003 | Faerber | |
| 2003/0050063 A1 | 3/2003 | Faerber | |
| 2004/0223469 A1 * | 11/2004 | Bahl et al. .................. | 370/331 |
| 2005/0064896 A1 * | 3/2005 | Rautiola et al. ......... | 455/553.1 |

FOREIGN PATENT DOCUMENTS

| | | |
|---|---|---|
| EP | 0 762 791 A2 | 3/1997 |
| GB | 2 320 339 A | 6/1998 |
| GB | 1 083 766  * | 8/2000 |
| WO | WO 01/058197 A1 | 8/2001 |
| WO | WO 01/67784 A2 | 9/2001 |
| WO | WO 02/063892  * | 8/2002 |

\* cited by examiner

*Primary Examiner*—Danh Cong Le
(74) *Attorney, Agent, or Firm*—Foley & Lardner LLP

(57) ABSTRACT

The invention relates to improvements in standby time in a dual mode mobile communication device.

A device according to the invention comprising means for repeatedly monitoring and determining signal quality of signals received on a first network, whilst the signal quality remains above a predetermined first threshold, means for also monitoring and determining signal quality of signals received on a second network at selected intervals if the determined signal quality in the first network falls below the first threshold and for switching-communication to the second network in dependence on the relative qualities of the two signals, and means for also monitoring and determining signal quality of signals received on the second network more frequently if the signal quality on the first network falls beneath a second lower threshold, and means for switching communication to the second network in dependence on the relative qualities of the two signals.

18 Claims, 5 Drawing Sheets

DUAL MODE MOBILE COMMUNICATION DEVICES AND METHOD FOR SELECTING A NETWORK

BACKGROUND OF THE INVENTION

1. Field of the Invention

This invention relates to improvements in standby time in a dual mode mobile communication device such as a mobile telephone or PDA with a cellular connection.

2. Description of the Related Art

Currently the most commonly used cellular communication network in most countries uses GSM technology to communicate. However, improvements in communication technology are being made and new communication formats are being produced. At least in the initial stages of rollout of a new format communication network, coverage will be patchy. Therefore, it is necessary for new handsets to be able to operate on at least the old network, e.g. GSM and new network, e.g., UMTS and to switch between the two for both monitoring the networks for quality of service and for receiving and making calls.

The trend has been to make smaller and smaller mobile communication devices such as mobile telephones. However, to be attractive to the public these devices require a significant standby time in order that they do not need to be recharged too frequently. Improvements in battery technology have enabled a reduction in size whilst at the same time permitting the standby time to be increased.

The major influences on standby time are battery size, the current which is drawn in receive mode when the device is monitoring the network for any incoming calls, and the time which is spent in receive mode.

A device which operates in a single network only has to monitor that network for incoming calls and does this periodically. However, a dual mode handset has to monitor two networks that use different access technologies (using two networks of the same technology is not a particular problem). Therefore, the time spent in receive mode will inevitably be higher than in a single network device. Typically, in a dual mode device, 40% of the standby current used is accounted for by leakages, 35% by monitoring the primary network, and 25% by monitoring the secondary network.

3. SUMMARY OF THE INVENTION

Preferred embodiments of the present invention seek to reduce the amount of power consumed by a dual mode handset when it is in standby mode.

The invention is defined in more detail in its various aspects in the appended claims to which reference should now be made.

Preferred embodiments of the invention will now be described in detail by way of example with reference to the drawings in which:

The above and other objects, features and advantages of the present invention will become apparent from the following description with reference to the accompanying drawings which illustrate examples of the present invention.

DETAILED DESCRIPTION OF THE PREFERRED EMBODIMENTS

Figure 1:
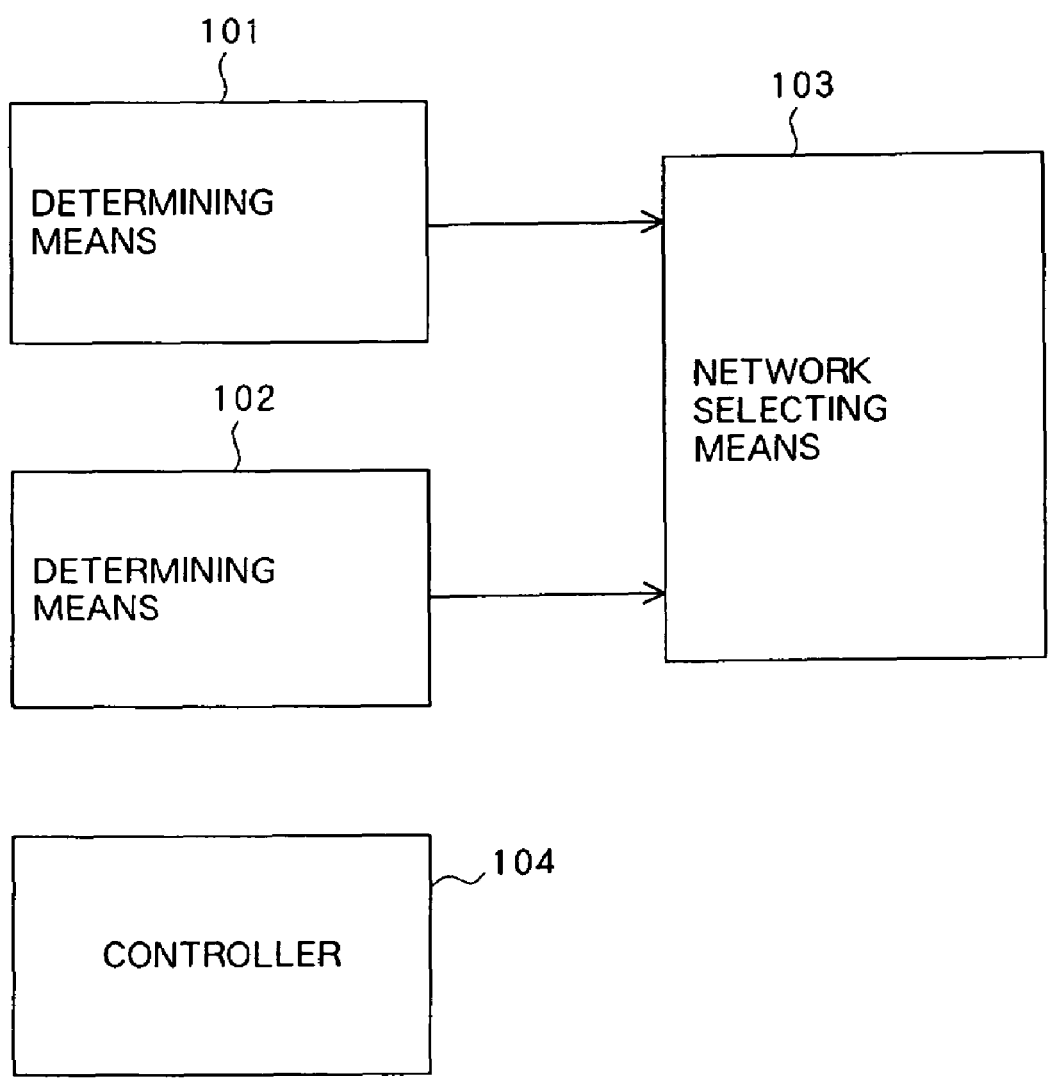
FIG. 1 is a block diagram showing the principal part construction of embodiment 1.

FIG. 1 is a block diagram showing the construction of the principal part of embodiment 1, and only the composition which switches the network to be used is shown.

As shown in FIG. 1, this embodiment is constructed by determining means 101 which monitors the 1st network (not shown) and determines signal quality Q1, and determining means 102 which monitors the 2nd network (not shown) and determines signal quality Q2, and network selecting means 103 receives signal quality Q1 output from determining means 101 and signal quality Q2 output from determining means 102, and switches the network used for communication, and controller 104 which controls the determining means 101, determining means 102 and network selecting means 103.

Figure 2:
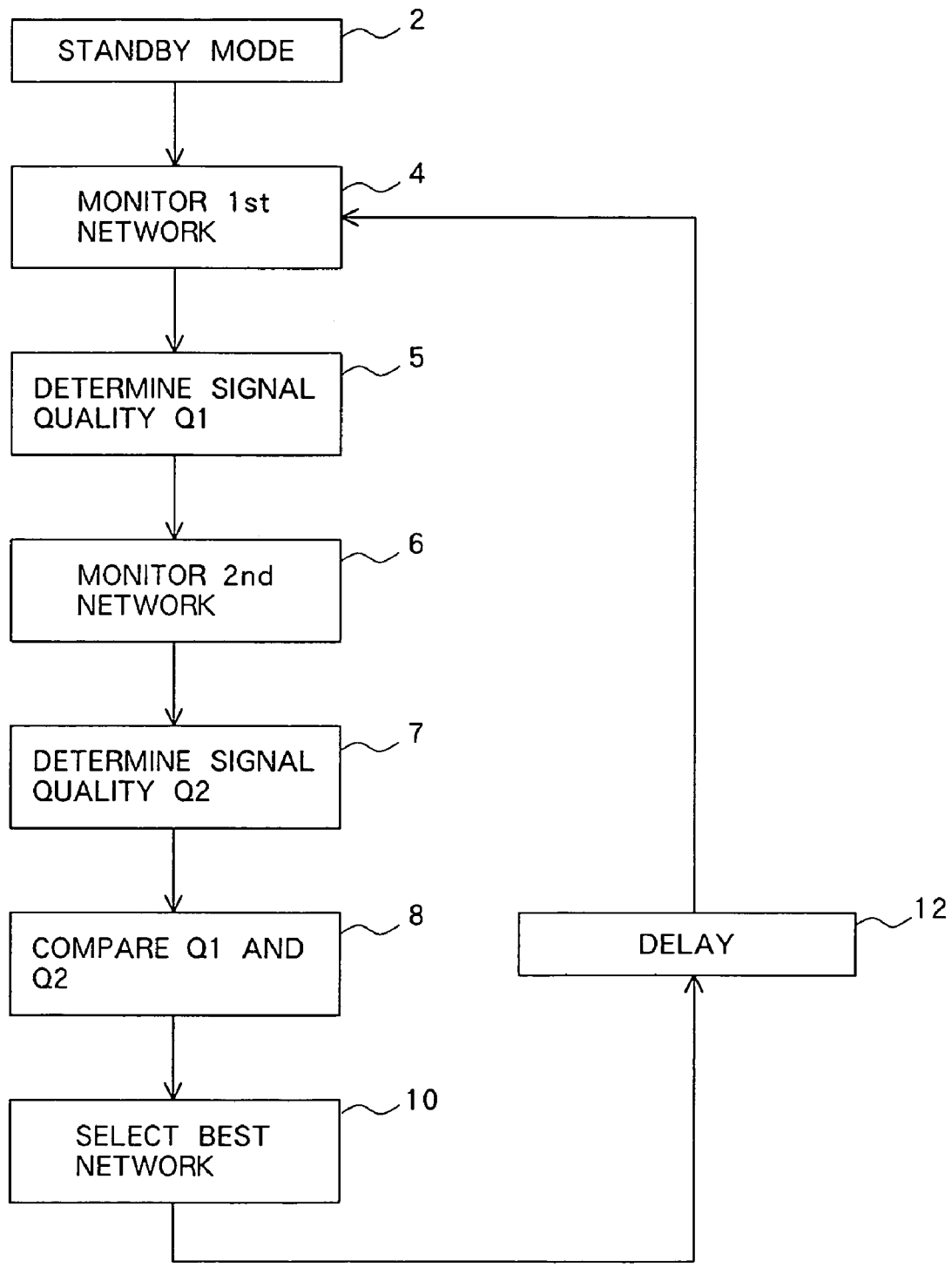
FIG. 2 shows schematically how a dual mode phone might monitor both networks.

FIG. 2 shows how a dual mode communication device can monitor two networks. The device is switched to standby mode at 2. It then goes into a loop in which it performs three operations. Firstly it monitors a number of cells in the first network at 4 and determines best signal quality Q1 at 5. Secondly it monitors the second network at 6 and determines its best signal quality Q2 at 7. Finally a comparison between qualities Q1 and Q2 is made at 8 and in response to this, the communication device selects the network giving the best quality reception at 10. There is then a delay 12 in the loop before the device again starts to monitor the first network at 4. If a call is received while it is monitoring either of the two networks this information is passed to call receive unit (not shown). This causes the phone to come out of the standby mode and subsequently to communicate on the first or second network in dependence on the network currently selected for communication.

Figure 3:
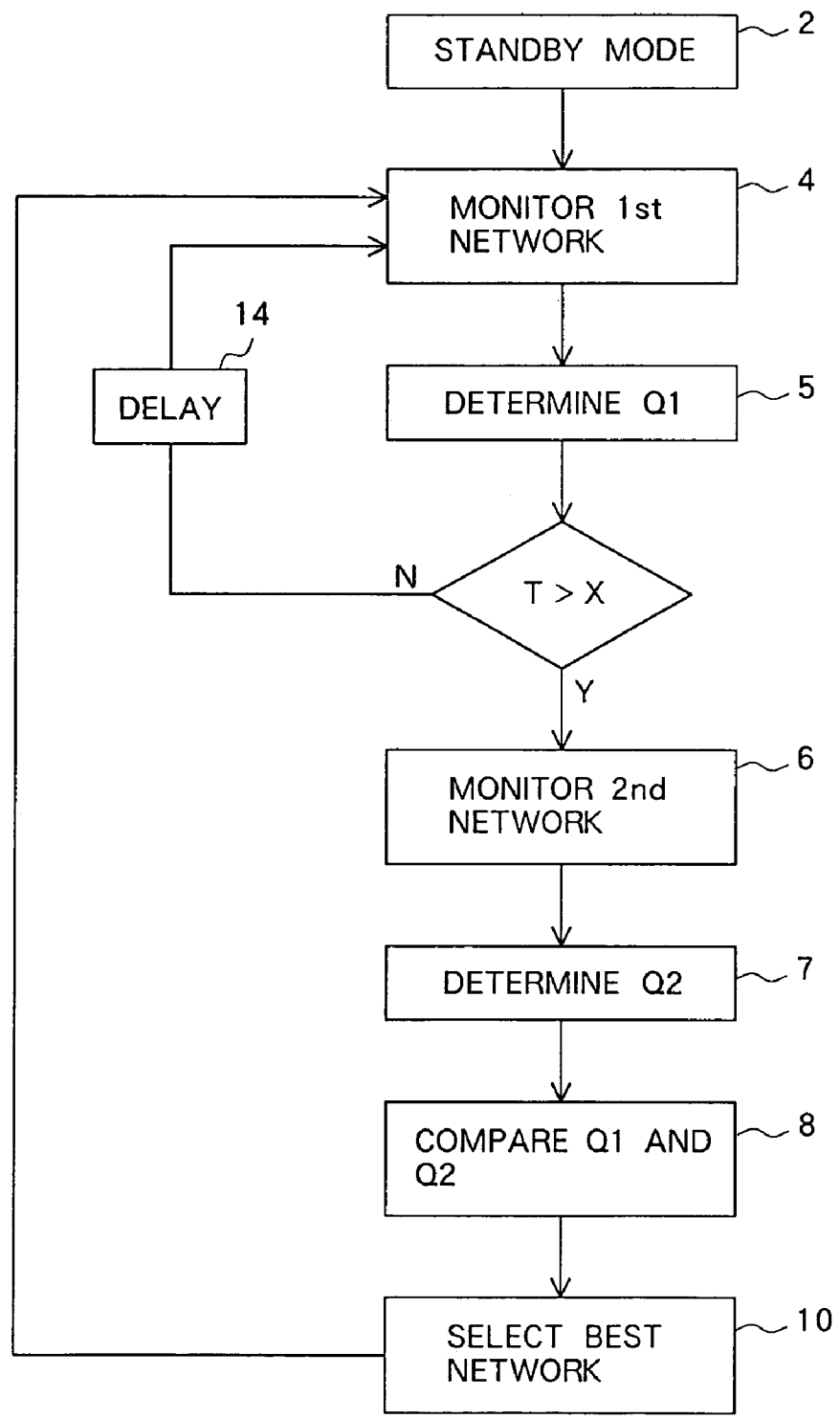
FIG. 3 shows an improvement on the arrangement of FIG. 2 in which a primary network is predominately monitored with a secondary network monitored less frequently.

Whilst this arrangement gives an acceptable solution to the monitoring of two networks in a dual mode device it is not particularly efficient. Half the monitoring activity is devoted to the second network even though the first network may be perfectly acceptable. This problem is partly solved by the arrangement of FIG. 3.

In FIG. 3, the device again goes into standby mode at 2. The main components are the same as those shown in FIG. 2. However, after the determination of Q1 at 5, there is a determination made to see if an elapsed time T since the second network was last monitored exceeds a threshold X. If it does not there is a delay 14 before the first network is again monitored at 4.

If T exceeds X then the second network is monitored at 6 as in FIG. 2 and a determination of Q2 made at 7 and compared with Q1 at 8. Switch 10 then switches communication for the device to network 2 if Q1 has fallen below a threshold T1 and Q2 is sufficiently high. After this, network 1 is again monitored at 4 and the loop continues as before. At 10 there is a selection back to network 1 when Q1 exceeds X, irrespective of the level of Q2.

This arrangement is a simple way of giving priority to the currently selected network. A variation on this solution is described in current GSM and UMTS specifications with defined values for the intra system delay and the variable X. However, the solution is not optimal precisely because the time delays are fixed. We therefore propose a system with dynamically variable timings. The intervals used are established by considering the quality measures of the currently selected network.

Figure 4:
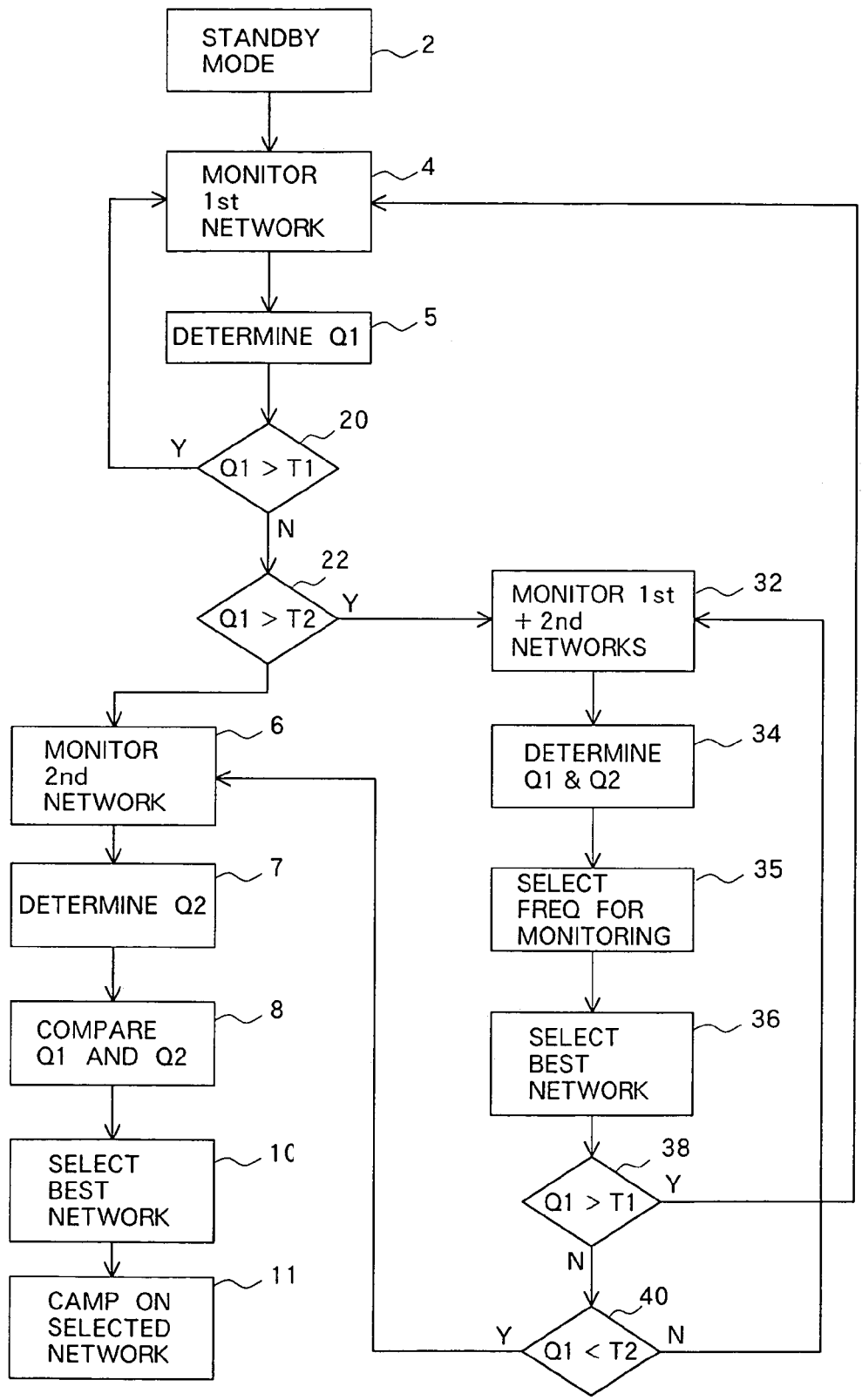
FIG. 4 shows how monitoring of two networks is performed in accordance with an embodiment of the invention.

In the preferred embodiment of the present invention illustrated in FIG. 4, the frequency of monitoring of the second network is adjusted according to the signal quality currently seen on the first network.

As discussed above, when networks are monitored, a quality assessment for the received signal is made for the particular radio access network (RAN). The measurements for different networks are different and so a scheme has to be devised to be used for comparison. The scheme used will be dependent on the two networks being compared but for the purposes of this description, the GSM and UMTS RANs will be described.

When a device is camped-on to a GSM network, a number of quality measures can be made. These are:

received signal strength (RSSI),
bit error rate (BER),
block error rate (BLER), and
frame erasure rate (FER).

These are only four of the possible measures. In normal single mode operation, a combination of some or all of these parameters along with offset values provided by the network enables an estimate of the quality of the signal being received from a given cell in the cellular network to be made. Offset values can be changed by the network to make any given cell look more or less attractive than its neighbours and thus equalise loading on the network. UMTS works in a broadly similar way although the technology is significantly different. Also, the measures used are different. Examples for the measures are:

pilot channel received signal code power (CPICHRSCP) and
signal to noise ratio (Eb/No).

Again, offset values can be applied by the network to equalise network loading. As discussed above, when the cells of one network technology are compared to those of another, mapping functions are used to translate the quality measurements to a common format.

Preferably when monitoring of a network is performed, be it either the first or second network, the signal quality from neighbouring cells is measured as well as that of the current serving cell. By looking at the current serving cell and neighbouring cells, it is possible to assess the likelihood of re-selection to another network being desirable.

The scheme behind the decision as to whether or not to look at re-selection makes use of two thresholds T1 and T2 which are used when assessing the quality measure Q for the camped-on network. For the purposes of this description we refer to Q as Q1 for the first network and Q2 for the second network.

Q1 is derived by a monitoring of the first network from the current serving cell and the neighbouring cells by giving appropriate weighting to the various cells examined. When Q1 is above T1, network re-selection is extremely unlikely and therefore no monitoring is performed on the second network.

When Q1 is below T2, re-selection is likely and therefore monitoring of the second network must be made in accordance with its specifications.

When Q1 on the first network is between T1 and T2, there is a possibility that re-selection to the second network will be required. Therefore, some monitoring has to be performed on the second network whilst the device remains camped-on the first network. However, this can be at a reduced rate, preferably on a sliding scale dependent upon the relative quality levels of Q1 and Q2. Preferably a linear sliding scale is used. This rate can therefore be changed as Q1 changes. As an alternative, in the T1<Q1<T2 region the rate can also be changed according to the level of Q2. For example, if Q1 is much higher than Q2 the re-selection is unlikely. This leads to a second sliding scale, this time based on the difference between Q1 and Q2. Preferably a linear relationship is used. For the best system the two sliding scales should be combined.

T1 and T2 will be network technology dependent and will need to be carefully assessed in each case. However, the principle can be applied to any given quality measurement in any network technology. There is also the possibility of making T1 and T2 dynamically adjustable to allow them to be set by network broadcast parameters. This would allow the best values for a particular location to be used.

An embodiment of this invention is shown in FIG. 4. The device is switched to standby mode at 2 and monitoring of the first network on which the device is camped-on commences at 4. Signal quality is determined at 5. A comparison of this with threshold T1 is then made at 20. If Q1 is greater than T1 the monitoring of the first network continues at 4 with subsequent repeated determinations of signal quality Q1 at 5 and comparison with T1 at 20.

If Q1 drops below the threshold of T1 a comparison of Q1 is then made with T2 at 22. If Q1 is lower than T2, then monitoring of the second network commences at 6. A determination of signal quality of Q2 is made at 7 and this is compared with Q1 at 8. The best network is then selected at 10 and the system camps-on that network at 11. This involves entering a loop similar to loop 4, 5, 20, 22 for either network with thresholds in decision boxes 20, 22 being set independence on the selected network.

If Q1 exceeds T1 as determined via 20 and 22, the device is switched back to camp-on to the first network. When the determination from 20 and 22 is that Q1 is between T1 and T2, the device monitors the first and second networks at 32 and determines Q1 and Q2 at 34. A monitoring frequency for subsequent monitoring in this loop is derived at 35. This can be based on a sliding scale linked to Q1 or Q2 or on a combination of both Q1 and Q2 as discussed above. Preferably a linear relationship is used to determine the monitoring frequency. A decision is made as to whether to switch from the first network to the second network. If the relative qualities are such that it would be preferable to switch to the second network, this is performed at 36. Q1 is then compared with T1 at 38 and if it exceeds T1 the system returns to monitoring of the first network at 4. If Q1 does not exceed T1 it is compared with T2 at 40. If it is still greater than T2, the monitoring takes place again at 32 at the frequency previously selected at 35. If it is less than T2 the control process is switched to second network monitoring as discussed above.

The arrangement of FIG. 4 can be modified to enable a network provider to ensure that its customers predominately use the network they provide, particularly in places where they provide only the primary network, e.g., the GSM network and not the second network, e.g., UMTS network. Therefore, the parameters will be set to make it as attractive as possible to the partner and to prevent re-selections to the second network unless absolutely necessary. For re-selection to the second network to be made as unlikely as possible there is little point in performing full monitoring on it. The modification required to FIG. 4 to achieve this are straightforward and will be clear to those skilled in the art.

The net result of the system of FIG. 4 is that in areas where there is strong coverage from the camped-on network, monitoring of the second network will not occur, thereby leading to a significant reduction in standby time. We believe this reduction can be as great as 33%. In areas where quality of Q1 is less then T2, monitoring of both networks will be performed as there will be no significant increase in standby time. In areas where Q1 falls between T1 and T2, the monitoring of the two networks will proceed at an intermediate rate dependent on the actual level of Q1 and Q2 and the improvement in standby time will be up to 33%. The figure of 33% is given by way of example. Different devices will offer different levels of improvement in standby time. However, we believe that some improvement will always be possible.

Figure 5:
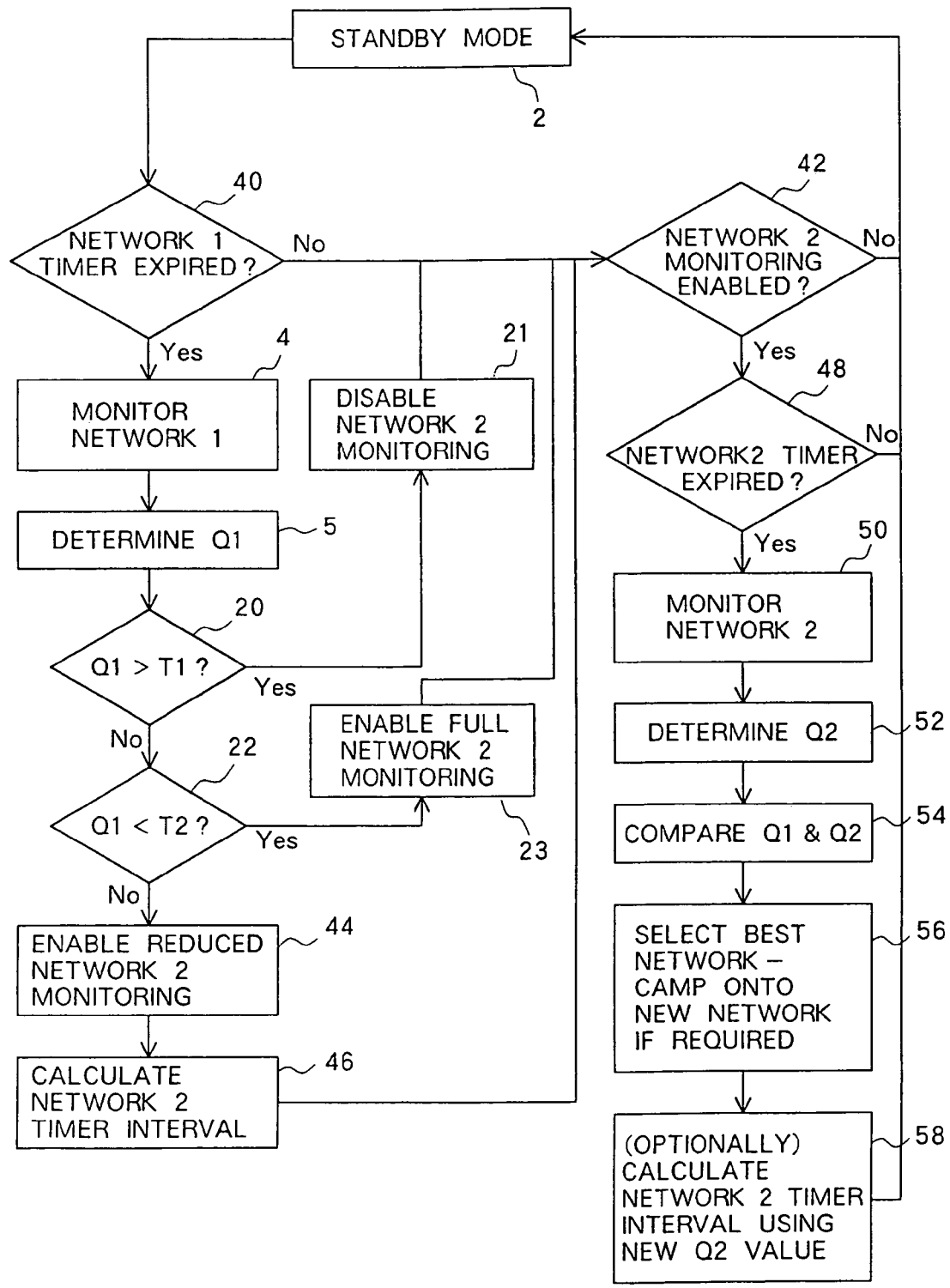
FIG. 5 shows an alternative embodiment of the invention.

Further embodiment of this invention is shown in FIG. 5. The device is switched to standby mode at 2 and a determination as to whether or not the network 1 timer has expired is made at 40. If it is has expired, then monitoring of network 1 commences at 4. Network timers control the monitoring intervals for the networks. If the interval has not been reached (as indicated by the timer expiring), the device remains in standby mode. A determination of the signal quality on network 1 (Q1) is made at 5. A comparison of this with threshold T1 is then made at 20. If T1 is greater than Q1, network 2 monitoring is disabled at 21. A determination is made as to whether to not network 2 monitoring is enabled, is made at 42. As this has just been disabled the result will be no and the system passes back to standby mode at 2 and subsequent network 1 monitoring.

If at 20 Q1 is determined to be lower than T1, a comparison of it is then made with T2 at 22. If it is less than T2 then full network 2 monitoring is enabled at 23 and then a determination made as to whether or not network 2 monitoring is enabled at 42. This will be discussed after the remainder of network 1 monitoring.

If Q1 is not less than T2 then a reduced monitoring of network 2 is enabled at 44. Subsequently a network 2 timer interval is calculated at 46. Control then flows to 42 where a determination is made as to whether or not network 2 monitoring is enabled. It is in this case enabled and also would be enabled in response to enabling at 23. A determination is made as to whether or not the network 2 timer has expired at 48. If it has, network 2 is monitored at 50. A determination of the signal quality on network 2 is made at 52 and a comparison of this with Q1 made at 54. In response to this comparison, a selection of the best quality signal is made and if appropriate a new network is camped-on at 56. Optionally, the network timer interval can be calculated using the new Q2 value at 58.

No changes are proposed to dual mode monitoring operation when the device is in connected mode. This is because monitoring is not a major factor in battery usage when the phone is in talk time mode, i.e., it is communicating.

Also, no changes are proposed to the intermittent search operation as this only applies in particular circumstances.

The invention claimed is:

1. A dual mode mobile communication device comprising:
    means for repeatedly monitoring and determining a signal quality of signals received on a first network, whilst the signal quality remains above a predetermined first threshold,
    means for monitoring and determining a signal quality of signals received on a second network at selected intervals if the determined signal quality in the first network falls below the first threshold and for switching communication to the second network in dependence on the relative qualities of the two signals,
    means for monitoring and determining a signal quality of signals received on the second network more frequently than at said selected intervals if the signal quality on the first network falls beneath a second lower threshold, and
    means for switching communication to the second network in dependence on the relative qualities of the two signals.

2. A dual mode mobile communication device according to claim 1 in which the selected intervals for monitoring the first and second networks when the quality of the signal on the first network falls below the first threshold are determined in dependence on the quality of signal on the first network.

3. A dual mode mobile communication device according to claim 2 in which the dependence on signal quality is a linear relationship based on two threshold levels and a current signal quality.

4. A dual mode mobile communication device according to claim 1 in which the selected intervals for monitoring the first and second networks when the quality of the signal on the first network falls below the first threshold are dependent on the quality of the signal received on the second network relative to the quality of the signal received on the first network.

5. A dual mode mobile communication device according to claim 4 in which the dependence on signal quality is a linear relationship based on the difference between the signal quality of the signal received on the first and second networks.

6. A dual mode mobile communication device according to claim 1 in which the selected intervals for monitoring the first and second network when the quality of the signal falls below the first threshold are dependent on both the quality of the signal received on the first network and the quality of the signal received on the second network relative to the quality of the signal received on the first network.

7. A dual mode mobile communication device according to claim 6 in which the dependencies on the quality of the signal received on the first network and the quality of the signal received on the second network are both linear.

8. A dual mode mobile communication device according to claim 1 wherein the threshold values can be dynamically changed.

9. A dual mode mobile communication device according to claim 8 wherein changes to the threshold values are broadcast by either one of the mobile networks or both and are received by the device.

10. A method for selecting a network for communication in a dual mode mobile communication device comprising the steps of:
    selecting a first network for communication;
    repeatedly monitoring and determining signal quality on the first network whilst the signal quality remains above a first threshold;
    monitoring and determining signal quality on the second network at selected intervals if the determined signal quality in the first network falls below the first threshold;
    switching communication to the second network in dependence on the relative qualities of the two signals;
    increasing the frequency of monitoring and determining the quality of the signal received on the second network if the quality of the signal received on the first network falls below a lower second threshold.

11. A method according to claim 10 in which monitoring and determining of signal quality on the first and second networks when the quality on the first network falls below the first threshold is performed at intervals dependent on the quality of the signal received on the first network.

12. A method according to claim 11 in which the dependence on signal quality is a linear relationship based on the first and a second threshold and a current signal quality.

13. A method according to claim 10 in which the monitoring and determining of signal quality on the first and second networks when the quality of the signal on the first network falls below the first threshold is performed at intervals dependent on the quality of the signal received on the second network relative to the quality of the signal received on the first network.

14. A method according to claim 10 in which the dependence on signal quality is a linear relationship based on the difference between the quality of the signal on the first network and the quality of the signal on the second network.

15. A method according to claim 10 in which the selected intervals for monitoring the first and second networks when the quality of the signal falls below the first threshold are dependent on both the quality of the signal received on the first network and the quality of the signal received on the second network relative to the quality of the signal received on the first network.

16. A method according to claim 15 in which the dependencies on the quality of the signal received on the first network and the quality of the signal received on the second network are both linear.

17. A method according to claim 16 including the step of dynamically changing the threshold value.

18. A method according to claim 17 including the step of broadcasting the threshold values by either or both the first and second networks.

* * * * *